United States Patent
Nakashima et al.

(10) Patent No.: US 10,156,277 B2
(45) Date of Patent: Dec. 18, 2018

(54) ALKALI-METAL TITANATE AND FRICTION MATERIAL

(71) Applicant: TOHO TITANIUM CO., LTD., Chigasaki-shi, Kanagawa (JP)

(72) Inventors: Mamoru Nakashima, Chigasaki (JP); Hideki Sakai, Chigasaki (JP); Daisuke Taki, Chigasaki (JP)

(73) Assignee: TOHO TITANIUM CO., LTD., Chigasaki-shi (JP)

( * ) Notice: Subject to any disclaimer, the term of this patent is extended or adjusted under 35 U.S.C. 154(b) by 0 days.

(21) Appl. No.: 15/578,806

(22) PCT Filed: Apr. 28, 2016

(86) PCT No.: PCT/JP2016/063370
§ 371 (c)(1),
(2) Date: Dec. 1, 2017

(87) PCT Pub. No.: WO2016/194531
PCT Pub. Date: Dec. 8, 2016

(65) Prior Publication Data
US 2018/0163805 A1    Jun. 14, 2018

(30) Foreign Application Priority Data

Jun. 2, 2015 (JP) ................................ 2015-111948

(51) Int. Cl.
| F16D 69/02 | (2006.01) |
| C01G 23/00 | (2006.01) |
| C09K 3/14 | (2006.01) |
| F16D 13/64 | (2006.01) |
| F16D 65/092 | (2006.01) |

(52) U.S. Cl.
CPC ........... *F16D 69/028* (2013.01); *C01G 23/00* (2013.01); *C01G 23/005* (2013.01); *C09K 3/14* (2013.01); *F16D 69/02* (2013.01); *F16D 13/64* (2013.01); *F16D 65/092* (2013.01); *F16D 2200/006* (2013.01); *F16D 2200/0043* (2013.01); *F16D 2200/0065* (2013.01)

(58) Field of Classification Search
CPC ........ C01G 23/00; C01G 23/005; C09K 3/14; F16D 69/02; F16D 69/028; F16D 65/092; F16D 13/64; F16D 2200/0065; F16D 2200/0043; F16D 2200/006
See application file for complete search history.

(56) References Cited

U.S. PATENT DOCUMENTS

| 3,320,025 | A |   | 5/1967 | Bichowsky |   |
|---|---|---|---|---|---|
| 3,760,068 | A | * | 9/1973 | Winter | C01G 23/005 |
|   |   |   |   |   | 423/598 |
| 4,041,143 | A | * | 8/1977 | Fujiki | C01G 23/005 |
|   |   |   |   |   | 252/62 |
| 4,689,211 | A | * | 8/1987 | Nishiuchi | C01G 23/005 |
|   |   |   |   |   | 423/598 |
| 5,147,579 | A | * | 9/1992 | Dean | B23K 35/3608 |
|   |   |   |   |   | 252/385 |
| 6,036,938 | A | * | 3/2000 | Konnai | C01G 23/005 |
|   |   |   |   |   | 423/598 |
| 6,251,361 | B1 | * | 6/2001 | Konnai | C01G 23/005 |
|   |   |   |   |   | 423/598 |
| 2016/0344025 | A1 | * | 11/2016 | Nagai | C01G 23/005 |

FOREIGN PATENT DOCUMENTS

| JP | 3-28126 A | 2/1991 |
|---|---|---|
| JP | 4-202099 A | 7/1992 |
| JP | 2008-110918 A | 5/2008 |
| JP | 2014-103032 A | 6/2014 |

OTHER PUBLICATIONS

Cortie et al., "Thermal Stability of $(K_xNa_yH_{1-x-y})_2Ti_6O_{13}$ Nanofibers," Eur. J. Inorg. Chem., 2011, vol. 2011 No. 33, pp. 5087-5095.
International Search Report dated Jul. 12, 2016, issued in counterpart International Application No. PCT/JP2016/063370 (2 pages).

* cited by examiner

*Primary Examiner* — Anthony J Green
(74) *Attorney, Agent, or Firm* — Westerman, Hattori, Daniels & Adrian, LLP

(57) ABSTRACT

Provided is an alkali-metal titanate in which the content and adhesivity of the fibrous potassium titanate is significantly reduced.
The alkali-metal titanate includes 0.5 mol to 2.2 mol of potassium oxide in terms of potassium atoms, 0.05 mol to 1.4 mol of sodium oxide in terms of sodium atoms, and 0 mol to 1.4 mol of lithium oxide in terms of lithium atoms relative to 1 mol of alkali-metal hexatitanate, in which a total content of potassium oxide in terms of potassium atoms, sodium oxide in terms of sodium atoms, and lithium oxide in terms of lithium atoms relative to 1 mol of alkali-metal hexatitanate is 1.8 mol to 2.3 mol; and the alkali-metal titanate has a single phase conversion ratio of 85% to 100%, a fiber ratio of 0% by volume to 10% by volume, and a moisture content of 0% by mass to 1.0% by mass.

8 Claims, No Drawings

ALKALI-METAL TITANATE AND FRICTION MATERIAL

TECHNICAL FIELD

The present invention relates to an alkali-metal titanate and a friction material.

BACKGROUND ART

Potassium titanate is a useful as a friction material for sliding members such as brake linings, disc pads, and clutch fading of braking devices in automobiles, railway vehicles, aircrafts, industrial machines, and the like. In particular, potassium hexatitanate (n is an integer of 6) has a tunnel crystal structure among potassium titanates represented by a general formula $K_2O \cdot nTiO_2$ (n is an integer of 1 to 12), and a friction material containing the potassium hexatitanate fibers (fibrous particles) has been particularly known to reveal an excellent heat resistance and the like Fibrous potassium titanate, however, has a poor formability due to its bulkiness and also it is hard to uniformly disperse the fibrous potassium titanate in the friction material due to a low flowability, which means it is difficult to handle the fibrous potassium titanate.

Therefore, non-fibrous potassium titanate has been developed by a pulverization process of a calcined potassium hexatitanate with an impact crusher instead of fibrous potassium titanate (refer to Patent Document 1 (Japanese Patent Application Publication No. 2008-110918)) and, non-fibrous potassium titanate has been disclosed which is containing 0.7% to 1.3% of a powder having a diameter of 3 μm or smaller, a length of 5 μm or larger, a ratio of the length to the diameter (an aspect ratio) of 3 or larger when the powder is observed under an electron microscope as the non-fibrous potassium titanate.

Potassium titanate has a strong adhesivity and thus a technical problem has been arised in that potassium titanate has a tendency of an adherence to an inner surface wall of a raw materials mixer or a pad molding machine in case of producing the friction material and the yield is likely to fall as a result.

PRIOR ART DOCUMENT

Patent Document

Patent Document 1: Japanese Patent Application Publication No. 2008-110918

SUMMARY OF THE INVENTION

Problem to be Solved by the Invention

An object of the present invention is to provide an alkali-metal titanate in which the content and adhesivity of the fibrous potassium titanate is significantly reduced and to provide a friction material including the alkali-metal titanate under the above circumstances.

Means for Solving the Problem

The inventors of the present invention have found that the above technical problem can be solved by an alkali-metal titanate comprising: 0.5 mol to 2.2 mol of potassium oxide in terms of potassium atoms, 0.05 mol to 1.4 mol of sodium oxide in terms of sodium atoms, and 0 mol to 1.4 mol of lithium oxide in terms of lithium atoms relative to 1 mol of alkali-metal hexatitanate, in which a total content of potassium oxide in terms of potassium atoms, sodium oxide in terms of sodium atoms, and lithium oxide in terms of lithium atoms relative to 1 mol of alkali-metal hexatitanate is 1.8 mol to 2.3 mol; and the alkali-metal titanate has a single phase conversion ratio of 85% to 100%, a fiber ratio of 0% by volume to 10% by volume, and a moisture content of 0% by mass to 1.0% by mass and have completed the present invention based on this finding, as a result of intensive studies to solve the above technical problem by the inventors of the present invention.

In other words, the present invention provides:

(1) An alkali-metal titanate comprising:

0.5 mol to 2.2 mol of potassium oxide in terms of potassium atoms, 0.05 mol to 1.4 mol of sodium oxide in terms of sodium atoms, and 0 mol to 1.4 mol of lithium oxide in terms of lithium atoms relative to 1 mol of alkali-metal hexatitanate, in which a total content of potassium oxide in terms of potassium atoms, sodium oxide in terms of sodium atoms, and lithium oxide in terms of lithium atoms relative to 1 mol of alkali-metal hexatitanate is 1.8 mol to 2.3 mol; and the alkali-metal titanate has a single phase conversion ratio of 85% to 100%, a fiber ratio of 0% by volume to 10% by volume, and a moisture content of 0% by mass to 1.0% by mass, (2) The alkali-metal titanate according to (1), in which the alkali-metal titanate comprises 0.9 mol to 2.2 mol of potassium oxide in terms of potassium atoms, 0.05 mol to 1.1 mol of sodium oxide in terms of sodium atoms, and 0 mol to 0.2 mol of lithium oxide in terms of lithium atoms relative to 1 mol of alkali-metal hexatitanate, and the alkali-metal titanate has a fiber ratio of 0% by volume to 7.0% by volume and a moisture content of 0% by mass to 0.8% by mass, (3) The alkali-metal titanate according to (1) or (2), in which the alkali-metal titanate comprises 1.2 mol to 2.2 mol of potassium oxide in terms of potassium atoms, 0.05 mol to 0.8 mol of sodium oxide in terms of sodium atoms, and 0 mol of lithium oxide in terms of lithium atoms relative to 1 mol of alkali-metal hexatitanate;

the total content of potassium oxide in terms of potassium atoms, sodium oxide in terms of sodium atoms, and lithium oxide in terms of lithium atoms relative to 1 mol of alkali-metal hexatitanate is 1.9 mol to 2.2 mol; and the alkali-metal titanate has a fiber ratio of 0% by volume to 5.0% by volume and a moisture content of 0% by mass to 0.6% by mass, and (4) A friction material comprising any one of the alkali-metal titanates as described in any one of (1) to (3).

Effects of the Invention

According to the present invention, the alkali-metal titanate can be provided so that the content and adhesivity of the fibrous potassium titanate is significantly reduced and also a friction material including the alkali-metal titanate can be provided.

MODES FOR CARRYING OUT THE INVENTION

First, the alkali-metal titanate of the present invention will be described as follows:

The alkali-metal titanate of the present invention includes 0.5 mol to 2.2 mol of potassium oxide in terms of potassium atoms, 0.05 mol to 1.4 mol of sodium oxide in terms of sodium atoms, and 0 mol to 1.4 mol of lithium oxide in terms of lithium atoms relative to 1 mol of alkali-metal hexatitanate, in which a total content of potassium oxide in terms of potassium atoms, sodium oxide in terms of sodium atoms, and lithium oxide in terms of lithium atoms relative to 1 mol of alkali-metal hexatitanate is 1.8 mol to 2.3 mol; and the alkali-metal titanate has a single phase conversion ratio of 85% to 100%, a fiber ratio of 0% by volume to 10% by volume, and a moisture content of 0% by mass to 1.0% by mass.

The alkali-metal titanate of the present invention includes 0.5 mol to 2.2 mol of potassium oxide in terms of potassium atoms, 0.05 mol to 1.4 mol of sodium oxide in terms of sodium atoms, and 0 mol to 1.4 mol of lithium oxide in terms of lithium atoms relative to 1 mol of alkali-metal hexatitanate.

The alkali-metal titanate of the present invention includes 0.5 mol to 2.2 mol of potassium oxide in terms of potassium atoms, preferably includes 0.9 mol to 2.2 mol of potassium oxide in terms of potassium atoms, and more preferably includes 1.2 mol to 2.2 mol of potassium oxide in terms of potassium atoms relative to 1 mol of alkali-metal hexatitanate.

The alkali-metal titanate of the present invention includes 0.05 mol to 1.4 mol of sodium oxide in terms of sodium atoms, preferably includes 0.05 mol to 1.1 mol of sodium oxide in terms of sodium atoms, and more preferably includes 0.05 mol to 0.8 mol of sodium oxide in terms of sodium atoms relative to 1 mol of alkali-metal hexatitanate.

The alkali-metal titanate of the present invention includes 0 mol to 1.4 mol of lithium oxide in terms of lithium atoms, preferably includes 0 mol to 0.2 mol of lithium oxide in terms of lithium atoms, and more preferably includes 0 mol of lithium oxide (does not include lithium oxide) in terms of lithium atoms relative to 1 mol of alkali-metal hexatitanate.

In the alkali-metal titanate of the present invention, the total content of potassium oxide in terms of potassium atom, sodium oxide in terms of sodium atoms, and lithium oxide in terms of lithium atoms relative to 1 mol of alkali-metal hexatitanate is 1.8 mol to 2.3 mol, preferably 1.8 mol to 2.2 mol, and more preferably 1.9 mol to 2.2 mol.

In the alkali-metal titanate of the present invention, each of the content of potassium oxide in terms of potassium atoms relative to 1 mol of alkali-metal hexatitanate, the content of sodium oxide in terms of sodium atoms relative to 1 mol of alkali-metal hexatitanate, and the content of lithium oxide in terms of lithium atoms relative to 1 mol of alkali-metal hexatitanate is in the above range as well as the total content of potassium oxide in terms of potassium atoms relative to 1 mol of alkali-metal hexatitanate, sodium oxide in terms of sodium atoms relative to 1 mol of alkali-metal hexatitanate, and lithium oxide in terms of lithium atoms relative to 1 mol of alkali-metal hexatitanate is in the above range, whereby the degree of adhesion can be easily controlled in a desired range.

The composition of the alkali-metal titanate of the present invention can be easily controlled by adjusting the mixing ratio of a titanium compound and an alkali metal compounds in a raw material mixture during preparation of the alkali-metal hexatitanate.

In this application document, the content of alkali-metal hexatitanate, the content of potassium oxide in terms of potassium atoms relative to 1 mol of alkali-metal hexatitanate, the content of sodium oxide in terms of sodium atoms relative to 1 mol of alkali-metal hexatitanate, and the content of lithium oxide in terms of lithium atoms relative to 1 mol of alkali-metal hexatitanate constituting the alkali-metal titanate means values measured by the following method each other.

An alkali-metal hexatitanate, $Na_2O_2$ and NaOH are placed in an crucible and heated to be melted. Thereafter, the resultant mixture is allowed to be cooled and dissolved into water and HCl added. A part of the dissolved liquid are taken as an analytical specimen.

The alkali-metal hexatitanate content for titanium element can be determined by a quantitative analysis with an aluminum reduction-ammonium sulfate iron (III) titration method. The metal contents for the other elements (potassium, sodium, and lithium), can be quantitatively determined by an ICP atomic emission spectroscopy.

The main crystal has a tunnel structure similar to the potassium hexatitanate in the alkali-metal titanate of the present invention. Usually, all of the potassium oxide, sodium oxide, and lithium oxide are contained in the same crystal. These oxides, however, can be partially situated outside of the crystal.

The alkali-metal titanate may include titanium dioxide like as impurities in the titanate of the present invention, although the main crystal has a tunnel structure similar to the potassium hexatitanate.

The main crystal of the alkali-metal hexatitanate of the present invention can be represented by the following general formula:

$$K_aNa_bLi_cTi_6O_{13}$$

(where $0.5 \leq a \leq 2.2$, $0.05 \leq b \leq 1.4$, $0 \leq c \leq 1.4$, and $1.8 \leq a+b+c \leq 2.3$)

In the above chemical composition, the preferable ranges and the more preferable ranges of a, b, c and a+b+c are as described above.

The potassium titanate of the present invention has a single phase ratio of 85% to 100%, preferably 87% to 100%, and more preferably 89% to 100%.

In this application document, the single phase ratio of the alkali-metal titanate means a value calculated by the following method.

This single phase ratio is defined as the following equation in which parameters are determined by measuring the diffraction pattern of the obtained alkali-metal titanate with a powder X-ray diffractometer (X-ray source: CuKα rays, model name: X'Part-ProMPD, manufactured by PANalytical B.V.) and calculating from the main peak heights of the alkali-metal hexatitanate and the impurities in the obtained diffraction pattern in accordance with the following calculation formula.

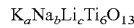

Single phase ratio (%)=$I/(I+S) \times 100$ (where I: the height of the peak of the highest intensity at 2θ=0° to 50° of the alkali-metal hexatitanate (chemical composition $K_aNa_bLi_cTi_6O_{13}$ ($0.5 \leq a \leq 2.2$, $0.05 \leq b \leq 1.4$, $0 \leq c \leq 1.4$, and $1.8 \leq a+b+c \leq 2.3$)) and S: the sum of the heights of the main peaks of all impurities).

Examples of the impurities may include $TiO_2$.

The potassium titanate of the present invention has a fiber ratio of 0% by volume to 10% by volume, preferably 0% by volume to 7% by volume, and more preferably 0% by volume to 5% by volume.

The potassium titanate of the present invention can be easily and uniformly dispersed in a friction material due to the low fiber ratio, the superior formability and the excellent flowability because the potassium titanate is formed of the specific composition.

In this application document, the fiber ratio of the alkali-metal titanate means a value calculated by the following method:

The alkali-metal titanate of 0.001 to 0.01 g is added to 10 g of water, and the sample of 0.3 g is taken from the water mixture while the alkali-metal titanate is being dispersed by stirring the water mixture for 5 minutes. The water mixture sample of 0.3 g is poured into 10 g of water and filtered with a membrane filter having a pore diameter of 0.2 μm and the resultant filter was dried. After the platinum was deposited on the resultant filter surface by using an ion spatter (manufactured by Hitachi Science Systems, Ltd.), an photo image was taken in such a magnification that round 100 or more particles are captured in one view field using a scanning electron microscope (model name: S-4700, manufactured by Hitachi High-Technologies Corporation).

A lengths of a major axis and minor axis of each particles were measured by using the commercial software of "an image analysis type particle size distribution measurement software" (model name: Mac-View Ver. 4, manufactured by Mountech Co., Ltd.) in which the minor axis to be the thickness (minor axis) and the major axis to be the length (major axis) in two orthogonal axes are determined by surrounding each crystal particles with a smallest rectangle shape, based on the obtained image (5 viewing fields or more) of 500 or more individual particles.

Subsequently, each measured crystal particle is regarded as a columnar shape and the total volume of the alkali-metal titanate and the volume of the fibrous substance are calculated in accordance with the following calculation formula using the minor axis as the diameter of the cylinder and the major axis as the length (height) of the cylinder. The fibrous substance is a particle having a major axis of 5 μm or longer, a minor axis of 3 μm or shorter, and an aspect ratio (ratio of "major axis/minor axis" measured by the above method) of 3 or higher.

Total volume (cm$^3$) of alkali-metal titanate=(Minor axis (cm)/2)$^2$×3.14×Major axis (cm)

Volume of fibrous substance (cm$^3$)=(Minor diameter of fibrous particle (cm)/2)$^2$×3.14×Major axis (cm) of fibrous particle The fiber ratio is calculated in accordance with the following calculation formula using the total volume and the volume of the fibrous substance of the alkali-metal titanate calculated in accordance with the above formula.

Fiber ratio (% by volume)=(Volume of fibrous substance/Total volume of alkali-metal titanate)×100

The potassium titanate of the present invention has a moisture content of 0% by mass to 1.0% by mass, preferably 0% by mass to 0.8% by mass, and more preferably 0% by mass to 0.6% by mass.

When the moisture content of the potassium titanate of the present invention is within the above range, adhesion can be easily reduced.

In this application document, the moisture content means a value measured by the following method:

About 10 g of alkali-metal titanate is placed in a dried beaker and heated at 105° C. for 1 hour. Thereafter, the alkali-metal titanate is cooled to room temperature in a desiccator and the mass is measured. The moisture content is calculated in accordance with the following formula.

Moisture content (% by mass)=(Mass of alkali-metal titanate after heating (g)/Mass of alkali-metal titanate before heating (g))×100

The potassium titanate of the present invention more preferably has an adhesivity of 0 g/m$^2$ to 7.0 g/m$^2$, further preferably 0 g/m$^2$ to 6.0 g/m$^2$, and particularly preferably 0 g/m$^2$ to 4.0 g/m$^2$.

The potassium titanate of the present invention is formed in the specific composition and thus has a low adhesivity as described above. This low adhesivity is able to allows the friction material to be produced without a significant yield falling In this application document, the adhesivity of the potassium titanate means a value calculated by the following method.

A sieve having mesh size of 2 mm and wire diameter of 0.9 mm, a tapping cell having a volume of 200 cc, and a spacer having a height of 30 mm are attached to a multi tester (MT-1001, manufactured by Seishin Enterprise Co., Ltd.). The feeder level is set to 6 and the tapping cell is filled with alkali-metal titanate to the full level. The tapping cell filled with the alkali-metal titanate is vertically rotated by 90° and held for 1 minute to discharge the alkali-metal titanate in the tapping cell. After the alkali-metal titanate is discharged, the value calculated from the mass (g) of the tapping cell before the alkali-metal titanate is filled and the mass of the tapping cell after the alkali-metal titanate is discharged in accordance with the following calculation formula is determined to be the adhesion amount.

Adhesion amount (g)=Mass of tapping cell after alkali-metal titanate discharge (g)−Mass of tapping cell before filling alkali-metal titanate (g)

Degree of adhesion (g/m$^2$)=Adhesion amount (g)/Surface area inside the tapping cell (m$^2$)

The potassium titanate of the present invention preferably has a specific surface area of 0.1 m$^2$/g to 20 m$^2$/g, more preferably 0.2 m$^2$/g to 18 m$^2$/g, and further preferably 0.3 m$^2$/g to 16 m$^2$/g.

In this application document, the specific surface area of the alkali-metal titanate means a value determined by a BET method using a specific surface area measuring apparatus (manufactured by Quantachrome Instruments Japan G.K.) at a degassing temperature of 350° C. and a degassing time of 45 minutes.

The potassium titanate of the present invention preferably has an average particle diameter of 2 μm to 100 μm, more preferably 5 μm to 90 μm, and further preferably 8 μm to 80 μm.

In this application document, the average particle diameter of potassium titanate means a diameter at which, for about 10,000 particles of the obtained potassium titanate, the area of a projected image of each particle is measured using a particle size/shape distribution measuring apparatus (Type PITA-2, manufactured by Seishin Enterprise Co., Ltd.) and the cumulative volume becomes 50% when diameters of circles having the same areas as the areas of the measured projected image are calculated and the volume frequency distribution is determined in terms of spheres having the calculated diameters.

Specifically, the potassium titanate of the present invention preferably has a specific surface area of 0.1 m$^2$/g to 16 m$^2$/g and an average particle diameter of 2 μm to 100 μm, more preferably a specific surface area of 0.2 m$^2$/g to 14 m$^2$/g and an average particle diameter of 5 μm to 90 μm, and further preferably a specific surface area of 0.3 m$^2$/g to 12 m$^2$/g and an average particle diameter of 8 μm to 80 μm.

Examples of the potassium titanate of the present invention may include potassium titanate having a specific surface area of 0.3 m$^2$/g to 1.4 m$^2$/g and an average particle diameter of 50 µm to 80 µm and potassium titanate having a specific surface area of 5.0 m²/g to 16 m²/g and an average particle diameter of 8 µm to 40 µm. Among them, the alkali-metal titanate having a specific surface area of 0.3 m²/g to 1.4 m²/g and an average particle diameter of 50 µm to 80 µm is suitable for controlling the fiber ratio from 0% by volume to 10% by volume.

According to the present invention, an alkali-metal titanate can be provided in which the fibrous potassium titanate content and adhesivity is significantly reduced.

Subsequently, a method for producing the alkali-metal titanate of the present invention will be described.

The method for producing the alkali-metal titanate of the present invention is not particularly limited as long as the method is capable of producing alkali-metal titanate having the composition and physical properties of the alkali-metal titanate of the present invention.

Examples of the method for producing the alkali-metal titanate of the present invention may include a method of raising the temperature of a raw material mixture containing a titanium compound and an alkali metal compound, heating and calcining the raw material mixture under specific conditions, thereafter cooling the calcined product, and pulverizing the obtained cooled product (hereinafter, this production method may be called the method for producing the alkali-metal titanate of the present invention).

In the method for producing the alkali-metal titanate of the present invention, the titanium compound is a titanium source that generates alkali-metal titanate by calcination. The preferable titanium compound is a compound that can suitably prepare alkali-metal hexatitanate.

Examples of the titanium compound include one or more compounds selected from titanium dioxide, titanium suboxide, orthotitanic acid or a salt thereof, metatitanic acid or a salt thereof, titanium hydroxide, peroxotitanic acid or a salt thereof and one or more titanium ores such as ilmenite. Among these titanium compounds, titanium dioxide is preferable. Titanium dioxide can be suitably used as the titanium compound because titanium dioxide is excellent in mixing property and reactivity with the alkali metal compound and inexpensive.

As titanium dioxide, titanium dioxide having a crystal form of rutile type or titanium dioxide having a crystal form of anatase type is preferable and the anatase type titanium dioxide is more preferable.

Potassium titanate having a large crystal diameter (a small specific surface area) can be easily obtained by using the rutile type titanium dioxide as the titanium compound.

The average particle diameter of the titanium compound is preferably from 0.1 mm to 10 mm, more preferably from 0.5 mm to 10 mm, and further preferably from 0.5 mm to 1 mm due to easy handling.

In this application document, the average particle diameter of the titanium compound means a value measured in accordance with a methods for sieving test of chemical products of JIS K 0069.

The form of the titanium compound is preferably an agglomerated product or a granulated product. The titanium compound can be uniformly mixed with the alkali metal compound by adopting the form of agglomerated product or granulated product.

As the agglomerated product or the granulated product of the titanium compound, the agglomerated product (including granulated powder) or granulated product of titanium dioxide are preferable.

In this application document, the agglomerated product of the titanium compounds means coarse particles (including the granulated powder) represented by $(n+1)^{th}$ particles obtained by agglomeration of $n^{th}$ particles of the titanium compound (n is an integer of 1 or more) such as secondary particles obtained by agglomeration of primary particles of the titanium compound and tertiary particles obtained by agglomeration of the secondary particles of the titanium compound having an average particle diameter of 0.1 mm or larger.

In this present application document, the granulated product of the titanium compound means granules having an average particle diameter of 0.1 mm or larger obtained by granulating the titanium compound.

In the method for producing the alkali-metal titanate of the present invention, the agglomerated product or granulated product of titanium compounds are products having an average particle diameter of 0.1 mm or more, the products having an average particle diameter of 0.5 mm to 10 mm are suitable, and the products having an average particle diameter of 0.5 mm to 1 mm are more suitable.

In this application document, the average particle diameter of the agglomerated product or granulated product of the titanium compound means a value measured in accordance with Test methods for sieving of chemical products of JIS K 0069.

Examples of agglomerated product of titanium dioxide include titanium dioxide produced from titanium sulfate and titanyl sulfate (sulfuric acid process titanium oxide), titanium dioxide produced by oxidizing or hydrolyzing titanium tetrachloride in a gas phase (vapor phase process titanium oxide), and titanium dioxide produced by neutralizing or hydrolyzing titanium tetrachloride aqueous solution or alkoxytitanium.

Final products such as titanium oxide for pigments are usually prepared from the sulfuric acid process titanium oxide, the vapor phase process titanium oxide or titanium dioxide produced by neutralizing or hydrolyzing titanium tetrachloride aqueous solution or alkoxytitanium by pulverizing, disintegrating, or classifying the agglomerated particles (clinker) obtained in the production process to adjust particle size distribution and removing coarse particles. In the production method of the present invention, however, the clinker is used as it is when the agglomerated product of titanium dioxide is used as the titanium compound.

When the clinker is used as the agglomerated product of titanium dioxide, the clinker can reduce sticking of a mixture at the time of mixing with a potassium compound and the mixture can be uniformly mixed. As a result, target potassium titanate can be produced without a treatment such as component adjustment.

Examples of the granulated product of titanium dioxide include a granulated product obtained by spray drying from a commercially available titanium oxide fine particles and a granulated product obtained by adding a binder to commercially available titanium oxide fine particles and kneading and granulating the resultant mixture.

By adopting a titanium dioxide granulated product as the titanium compound, even when the granulated product is mixed with a potassium compound using a mechanical mixing apparatus having a large crushing energy such as a vibration mill, adhesion and sticking of the mixture to the inner wall of the mixing apparatus such as the vibration mill can be effectively reduced and the mixture can be uniformly mixed.

The alkali metal compound is an alkali metal source (K, Na, or Li) at the time of producing the alkali-metal hexatitanate of the present invention by calcination.

The preferable alkali metal compound is a compound that can suitably prepare the alkali hexatitanate of the present invention.

Examples of the alkali metal compound include a potassium compound, a sodium compound, and a lithium compound.

Examples of the potassium compound include one or more compounds selected from potassium oxide, potassium carbonate, potassium hydroxide, potassium oxalate, and the like and potassium carbonate is preferable.

Examples of the sodium compound include one or more compounds selected from sodium oxide, sodium carbonate, sodium hydroxide, sodium oxalate, and the like and sodium carbonate is preferable.

Examples of the lithium compound include one or more compounds selected from lithium oxide, lithium carbonate, lithium hydroxide, lithium oxalate, and the like and lithium carbonate is preferable.

These alkali metal compounds are melted or decomposed during the calcination reaction to easily react with the titanium compound and only generate carbonic acid gas, water, and the like even after decomposition, and thus the impurities are difficult to remain in the product.

The raw material mixture containing the titanium compound and the alkali compound may be effectively supplied to the mixing process in an amount corresponding to the composition represented by $K_aNa_bLi_cTi_6O_{13}$ ($0.5 \leq a \leq 2.2$, $0.05 \leq b \leq 1.4$, $0 \leq c \leq 1.4$, and $1.8 \leq a+b+c \leq 2.3$). In consideration of volatilization in the calcination step being the next step, however, the alkali metal compound is preferably contained in 0% by mole to 15% by mole excess relative to the theoretical amount of the alkali atom calculated in accordance with the above general formula, more preferably contained in 5% by mole to 15% by mole excess, and further preferably in 10% by mole to 14% by mole excess.

As described below the raw material mixture may further contain metallic titanium powder or titanium hydride powder together with the titanium compound and the alkali metal compound. However, the metallic titanium powder or titanium hydride powder is oxidized to turn into titanium dioxide constituting the alkali-metal hexatitanate and thus, in the method for producing the alkali-metal titanate of the present invention, the mixing ratio is adjusted also including the metallic titanium powder or titanium hydride powder as the titanium source of alkali-metal hexatitanate to be obtained.

In the method for producing the alkali-metal titanate of the present invention, the composition of the alkali-metal titanate being the final product can be easily controlled by adjusting the mixing ratio of the titanium compound and the alkali metal compound in the raw material mixture.

The raw material mixture preferably contains 85% by mass to 100% by mass and more preferably 85% by mass to 97% by mass of the titanium compound and the alkali metal compound in terms of solid content.

In addition to the titanium compound and the alkali metal compound, the raw material mixture may further contain an alkaline earth metal compound such as a magnesium compound or a barium compound.

The shape of potassium titanate to be obtained is easily controlled into a desired shape while generation of fibrous crystals during the calcination process described below is being reduced also by using the raw material mixture containing the alkaline earth metal compound such as the magnesium compound or the barium compound.

In the method for producing the potassium titanate of the present invention, the raw material mixture may further contain other compounds such as inorganic oxides in a slight amount in addition to the titanium compound and the alkali metal compound to the extent that the other compounds do not affect the generation of potassium titanate.

Examples of the inorganic oxide include one or more inorganic oxides selected from $Fe_2O_3$, $Al_2O_3$, $SiO_2$, $CeO_2$, $WO_3$, $ZrO_2$, $Zr(CO_3)_2$, and $CaCO_3$.

When the raw material mixture further contains the inorganic oxide in addition to the titanium compound and the alkali metal compound, the inorganic oxide content in the mixture is preferably 5% by mass or lower, more preferably 3% by mass or lower, and further preferably 1% by mass or lower in total in terms of the solid content.

A predetermined amount of alcohols is preferably added into the raw material mixture in this time.

Examples of the alcohols include one or more alcohols selected from methanol, ethanol, amyl alcohol, allyl alcohol, propargyl alcohol, ethylene glycol, propylene glycol, erythrol, 2-butene-1,4-diol, glycerin, pentaerythritol, arabitol, sorbitol, heptitol, polyethylene glycol, polypropylene glycol, and polyglycerol. Among them, methanol and ethanol are preferable because of the relatively low boiling points.

As described above, the raw material mixture can be obtained by mixing a desired amounts of the titanium compound, the alkali metal compound, and, if necessary, the inorganic oxide and the like. When the titanium compound and the alkali metal compound are pulverized and mixed, these compounds are preferably pulverized and mixed while the alcohols are being vaporized by heating these compounds in the mixing apparatus up to the boiling point of the alcohols or higher to be added. By this process, the raw material mixture in which the titanium compound and the alkali metal compound are more uniformly dispersed can be obtained while the adhesion and sticking of the titanium compound and the like are being reduced.

The raw material mixture preferably further contains additives such as a predetermined amount of an agglomeration inhibitor, a lubricant, and the like.

As the additives, additives that do not remain in the obtained potassium titanate by decomposition, combustion, or vaporization during calcination of the raw material mixture containing the titanium compound and the potassium compound are preferable. Examples of such additives include celluloses, fatty acids, sugars, grains, ureas, and polymers.

Specific examples of the additives include one or more additives selected from methyl cellulose, lignin, wood powder, pulp powder, natural fiber powder, stearic acid, ammonium stearate, sorbitan distearate, sugars such as xylose, glucose, galactose, sucrose, starch, and dextrin, wheat flour, soy flour, rice flour, sugar, urea, biurea, semicarbazide, guanidine carbonate, aminoguanidine, azodicarbonamide, acrylic resin powder, polypropylene powder, polyethylene powder, and polystyrene powder. In particular, one or more additives selected from the wood powder, the pulp powder, and the natural fiber powder in the form of solid powder or solid pellet are preferable.

In the method for producing the alkali-metal titanate of the present invention, when the raw material mixture further contains the alcohols and additives in addition to the titanium compound and the alkali metal compound, the content of the alcohols and the additives in the mixture is preferably 0.1% by mass to 3.0% by mass and more preferably 0.3% by mass to 1.0% by mass in total.

The raw material mixture may further contain the metallic titanium powder or the titanium hydride powder, if necessary.

The content of the metallic titanium powder or the titanium hydride powder in the raw material mixture is preferably 0.01 mol to 0.2 mol and more preferably 0.03 mol to 0.1 mol relative to 1 mol of titanium atoms in the titanium compound.

The raw material mixture contains the metallic titanium powder or the titanium hydride powder, whereby deviation of the temperature distribution inside the reaction container can be reduced by simultaneously burning in the reaction container at the time of calcination described below and the reaction can be more uniformly carried out. As a result, the potassium titanate having the target composition can be easily obtained.

The raw material mixture can be prepared by mixing the titanium compound, the alkali metal compound, and, if necessary, the inorganic oxide and the like. As a method for mixing these components, either a dry mixing method or a wet mixing method can be adopted. The dry mixing method is preferable from the viewpoint of process simplification.

Mixing of the titanium compound and the alkali metal compound, and the inorganic oxide added as necessary is preferably carried out using a known mixing means. Preferable examples of the mixing means include one or more mechanical pulverizing devises selected from a vibration mill, a vibration rod mill, a vibration ball mill, a bead mill, a turbo mill, and a planetary ball mill. The vibrating rod mill equipped with a stick-shaped rod as a pulverizing medium is more preferable.

When the mixing is carried out using the vibration rod mill, conditions of an amplitude width of vibration of 2 mm to 6 mm and a processing time of 10 minutes to 120 minutes are preferable.

By mixing with the vibration rod mill, the titanium compound and the alkali metal compound can be mixed while co-pulverizing and a powder having a relatively large particle diameter can be pulverized between the rods, whereas excessive pulverizing of finer powder as in the case of processing with a ball mill can be prevented.

In particular, when titanium oxide is used as the titanium compound, titanium oxide originally has strong adhesion due to the hydroxy group present on the surface and the specific surface area becomes larger as the particle diameter becomes smaller, and thus when the mixture is excessively pulverized, the pulverized material tends to stick to the inside of the apparatus. By mixing the mixture using the vibration rod mill, however, the sticking of such pulverized product is prevented and pulverizing and mixing can be carried out uniformly as compared with other mixing methods.

Even when the agglomerated product or the granulated product of titanium dioxide is used as the titanium compound, the coarse particles of titanium dioxide are pulverized and disintegrated and the excessive pulverizing of the fine powder such as primary particles is prevented by mixing with the vibration rod mill and thus sticking of the titanium dioxide to the inside of the apparatus is prevented and the mixture can be uniformly mixed.

When the raw material mixture is prepared by mixing the titanium compound, the alkali metal compound and, if necessary, the inorganic oxide and the like by the wet mixing method, examples of mixing solvents include one or more solvents selected from pure water, alcohols, acetone, MEK, and THF, which are organic solvents commonly used. In order to improve the dispersibility of the mixed powder and to mix it uniformly, a surfactant or a dispersing agent is preferably used together with the mixed powder.

The raw material mixture containing the titanium compound and the alkali metal compound is suitably heated and calcined in the temperature from 950° C. to 1,050° C. or 1,150° C. to 1,400° C.

When the calcination temperature ranges from 950° C. to 1,050° C., particle growth in the longitudinal direction (major axis direction) of the alkali-metal titanate is restricted and thus spherical alkali-metal titanate can be produced with a small aspect ratio, whereas, when the calcination temperature ranges from 1,150° C. to 1,400° C., the particle growth is promoted and thus the thickness (minor axis) of the obtained calcined powder becomes thicker (longer).

In order to obtain potassium titanate having a specific surface area of 0.3 $m^2/g$ to 1.4 $m^2/g$ and an average particle diameter of 50 μm to 80 μm in good yield, the above calcination temperature is preferably controlled in the range from 1,150° C. to 1,400° C.

Examples of the method for carrying out the calcination include a method of calcining the raw material mixture in a state where the raw material mixture is charged in a reaction container, a method of adding a binder or the like to the raw material mixture, molding the mixture into a molded product having a desired shape, and thereafter calcining the molded product, and a method of introducing the raw material mixture in a rotary kiln and calcining the introduced raw material mixture in a flowing state. In consideration of a calcination profile, a method of calcining the raw material mixture in a flowing state using the rotary kiln or the like is preferable.

As a reaction container or furnace body used at the time of calcination, the reaction container or furnace body is preferably made of ceramics. Specific examples may include the reaction container or the furnace body made of a ceramic material such as alumina. Examples of the shape of the reaction container and furnace body used at the time of calcination include a cylindrical object, a columnar object having a recessed part, a rectangular object having a recessed part, and a dish-shaped object.

In contacting the raw material mixture with the ceramic reaction container or the furnace body, a sheet material to be carbonized in the calcination stage is preferably interposed between the raw material mixture and the ceramic reaction container or the furnace body.

The above mentioned sheet material is preferably made of such a material that it will burn out in the calcination stage and will not leave a soft or flowable by-product. Specific examples of the sheet material include one or more materials selected from a paper, a natural fiber, a bark, and a thermosetting resin.

When the paper is the above mentioned sheet material, the paper is not preferably laminated with such a material to be softened and hardly carbonized such as vinyl chloride. Examples of the paper include wrapping papers such as the so-called unbleached kraft paper, both bleached kraft paper, and one-sided matting paper; paperboard base paper, and paper for information such as news print paper, high quality paper, medium quality paper, recycled paper, book paper, cast coated paper, art paper, and PPC paper.

When the natural fiber is the above mentioned sheet material, it may include cotton, hemp, and silk for example. When a thermosetting resin is the above mentioned sheet material, it may include a phenol resin, an epoxy resin, and a melamine resin for example.

The form variations of the above mentioned sheet material include a sheet, a woven fabric, a nonwoven fabric, and a bag for examples.

It can be prevented from the raw materials loss in melting the alkali metal compound in the calcination stage and the penetration loss of the melted alkali metal compound into the ceramic reaction container or the furnace body by interposing the above mentioned sheet material between the raw material mixture and the ceramic reaction container or the furnace body.

At the time of calcining the mixture, loss of the raw materials caused by melting the alkali metal compound in the raw material mixture at the time of calcination and penetration of the melted alkali metal compound into the ceramic reaction container or the furnace body can be prevented by interposing the sheet material made of the material to be carbonized at the time of calcination between the contact part and the ceramic reaction container or the furnace body.

It can be suitably prevented from the potassium compound loss and the penetration loss of the potassium compound into the ceramic reaction container by charging the raw material mixture after the sheet material is placed on the whole recessed bottom surface in the ceramic reaction container for example.

It can be more suitably prevented from the potassium compound loss and the penetration loss of the potassium compound into the ceramic reaction container by introducing the mixture after the sheet material is placed on the whole recessed bottom surface in the ceramic reaction container.

The maximum calcination temperature ranges preferably from 970° C. to 1,040° C. and more preferably from 1,200° C. to 1,350° C. in the method for producing the alkali-metal titanate of the present invention.

The single phase formation ratio of the obtained alkali-metal titanate can be increased and the fiber ratio of the obtained alkali-metal titanate can be reduced by controlling the maximum calcination temperature within the above range.

There is particularly no limitation of the heating rate up to the highest calcination temperature, however, the heating rate is preferably controlled in the range from 2° C./min to 70° C./min.

The holding time at the highest calcination temperature is preferably controlled from 10 minutes or longer and more preferably 20 minutes to 480 minutes in the calcination stage.

The cooling rate is preferably controlled from 2° C./min to 300° C./min in the range from the highest calcination temperature down to 500° C.

The fiber ratio of the obtained alkali-metal titanate can be further reduced by controlling the cooling rate from the highest calcination temperature down to 500° C.

The calcined product of the alkali-metal titanate obtained in the calcination stage is pulverized.

The same pulverization means are recommended as the mixing means used in the mixing of the titanium compound and the alkali metal compound.

It will be preferably recommended to be one or more pulverizing means selected from vibration mills (a vibrating rod mill, a vibration ball mill, and the like.) and impact grinders (a high speed rotary mill, a high speed rotary mill with a built-in classifier, a container drive medium mill, a medium stirring mill, an air flow type grinding machine, and the like), and the vibration rod mill as examples of the pulverizing means. More preferably, the fiber ratio in the alkali-metal titanate can be easily reduced when the calcined powder obtained in the calcination process is pulverized by combining the vibration mill and the impact grinder.

When the calcined product is pulverized using the vibrating rod mill, the preferable pulverizing conditions are shown as an vibration amplitude of 2 mm to 6 mm and a charge rate of the calcined product of 20 kg/hour to 100 kg/hour, and a processing time of 1.5 hours to 7.5 hours.

When the calcined product is pulverized by using the high speed rotating mill with built-in classifier, the preferable pulverizing conditions are shown as a rotation speed of 40,000 rpm to 100,000 rpm, a feed rate of the calcined powder of 20 kg/hour to 100 kg/hour, and a processing time of 1.5 hours to 7.5 hours.

The calcined product obtained by the calcination process contains potassium titanate crystals having an increased length in the direction of the thickness (the minor axis) of the columnar shape. Many of the potassium titanate crystals, however, are relatively agglomerated products strongly adhered to each other and thus the potassium titanate crystals can be pulverized to a desired particle diameter by the pulverizing process.

The pulverized product can be subjected to a further classification process or sieving process, resulting to the desired alkali-metal titanate.

The obtained potassium titanate has an excellent heat resistance and thus can be suitably used for a friction modifier or the like.

According to the present invention, the potassium titanate can be provided in which the fibrous potassium titanate content and the adhesivity is highly reduced.

Subsequently, the friction material of the present invention will be described as follows:

The friction material of the present invention is characterized in that the friction material includes the alkali-metal titanate of the present invention.

Specific examples of the friction material according to the present invention include a friction material containing a base fiber, a friction modifier made of the alkali-metal titanate of the present invention and the like, and a binder.

Examples of the base fiber include one or more base fibers selected from resin fibers such as an aramid fiber, metal fibers such as a steel fiber and a brass fiber, a carbon fiber, a glass fiber, a ceramic fiber, a rock wool, and a wood pulp.

In order to improve the dispersibility and the adhesivity to the binder, the surfaces of these base fibers may be processed with a silane coupling agent such as an aminosilane-based agent, an epoxy silane-based agent, or a vinyl silane-based agent, a titanate-based coupling agent, and a phosphate ester.

As the friction modifier, other friction modifiers may be added in addition to the alkali-metal titanate of the present invention within the range of not impairing the effect of the present invention.

Examples of other friction modifiers include one or more friction modifiers selected from organic powders such as vulcanized or unvulcanized natural rubber powder and synthetic rubber powder, cashew resin powder, resin dust, and rubber dust, inorganic powders such as carbon black, graphite powder, molybdenum disulfide, barium sulfate, calcium carbonate, clay, mica, talc, diatomaceous earth, antigorite, sepiolite, montmorillonite, zeolite, sodium triantitanate, sodium pentathitolate, and potassium octatitanate, powders of metals such as copper, aluminum, zinc, and iron, oxide powders such as alumina, silica, chromium oxide, titanium oxide, and iron oxide.

Examples of the binder include one or more binders selected from organic binders including thermosetting resins such as a phenol resin, a formaldehyde resin, a melamine resin, an epoxy resin, an acrylic resin, an aromatic polyester resin, and a urea resin, elastomers such as natural rubber, nitrile rubber, butadiene rubber, styrene butadiene rubber, chloroprene rubber, polyisoprene rubber, acrylic rubber, high styrene rubber, and a styrene propylene diene copolymer, thermoplastic resins such as a polyamide resin, a polyphenylene sulfide resin, a polyether resin, a polyimide resin, a polyether ether ketone resin, and a thermoplastic liquid crystal polyester resin, and inorganic binders including alumina sol, silica sol, and a silicone resin.

In addition to each of the above components, components such as rust preventive agents, lubricants, and abrasives can be added, if necessary.

The method for producing the friction material of the present invention is not particularly limited and can be appropriately produced according to conventionally known methods for producing friction materials.

As one example of the method for producing the friction material of the present invention, a method of dispersing the base fiber in the binder, blending the friction modifier and other components blended as necessary in combination to prepare a friction material composition, subsequently pouring the friction material composition in a mold, and pressurizing and heating the friction material composition to carry out binding molding can be exemplified.

As another example, a method of melting and kneading the binder in a twin-screw extruder, blending the base fiber, the friction modifier, and other components blended as necessary in combination from the side hopper, carrying out extrusion molding, and thereafter, machining into a desired shape can be exemplified.

As another example, a method of dispersing the friction material composition in water or the like and subjecting the dispersed friction material composition to a paper making process on a paper making mesh, dewatering, forming into a sheet shape, heating and pressing by a pressing machine to carry out binding molding, and appropriately cutting and polishing to obtain the friction material having a desired shape can be exemplified.

The friction material of the present invention uses the alkali-metal titanate of the present invention as the raw material for the friction material and thus has a stable friction coefficient.

Therefore, the friction material of the present invention can provide improvement effect for improving and stabilizing braking functions as materials for braking members such as materials for clutch facings and materials for brakes including brake linings and disc pads used for automobiles, railway vehicles, aircrafts, and various industrial devices.

EXAMPLES

Subsequently, the present invention will be described more specifically with reference to Examples and Comparative Examples. The present invention, however, is not limited by the following Examples at all.

Example 1

1. Raw Materials

As titanium raw materials (titanium compounds), 54.27 kg of titanium oxide having a specific surface area of 9 m²/g (manufactured by COSMO CHEMICAL CO., LTD., purity 98.8%) and 47.60 kg of titanium oxide having a specific surface area of 1.6 m²/g (manufactured by Rio Tinto Fer et Titane inc., purity 94.7%) were used.

As alkali raw materials (alkali metal compounds), each of 27.09 kg of potassium carbonate (manufactured by Unid Co., Ltd., purity 99.9%), 1.03 kg of sodium carbonate (manufactured by Tokuyama Corporation, purity 99.5%), and 0 kg of lithium carbonate (manufactured by Sichuan Tianqi lithium industries, inc., purity 98.8%,) was used.

The amounts of individual raw materials used are listed in Table 1.

2. Mixing

Into a vibration rod mill (manufactured by Chuo Kakohki Co., Ltd.), the raw materials of the above amounts and a denatured alcohol (manufactured by Sankyo Chemical Co., Ltd.) were charged and the resultant mixture was mixed for 20 minutes to obtain a mixed raw material powder (a raw material mixture).

3. Calcination

The mixed raw material powder (the raw material mixture) was placed in a sagger made of cordierite and mullite and calcined in a box type electric furnace (manufactured by Motoyama Co., Ltd.) in the atmosphere at a calcination temperature of 980° C. for 0.5 hour as listed in Table 2.

4. Pulverization

The obtained calcined powder was charged into a vibrating rod mill (manufactured by Chuo Kakohki Co., Ltd.) at a rate of 50 kg/h and subsequently charged into a ACM pulverizer (manufactured by Hosokawa Micron Corporation) for pulverization.

The obtained alkali-metal titanate contained 1.9 mol of potassium oxide in terms of potassium atoms and 0.1 mol of sodium oxide in terms of sodium atoms relative to 1 mol of alkali-metal hexatitanate (the total content of potassium oxide in terms of potassium atoms, sodium oxide in terms of sodium atoms, and lithium oxide in terms of lithium atoms relative to 1 mol of alkali-metal hexatitanate was 2.0 mol) and had the main crystal having a tunnel structure similar to potassium hexatitanate.

Table 3 lists the single phase conversion ratio, the fiber ratio, the moisture content, the degree of adhesion, the specific surface area, and the average particle diameter of the obtained alkali-metal titanate. Methods for measuring these physical properties are as described in the text of this specification.

Example 2

An alkali-metal titanate was obtained in the same manner as in Example 1 except that each of the raw material amounts in "1. Raw materials" was changed as listed in Table 1 and the calcination conditions in "3. Calcination" were changed as listed in Table 2.

The obtained alkali-metal titanate contained 1.9 mol of potassium oxide in terms of potassium atoms and 0.1 mol of sodium oxide in terms of sodium atoms relative to 1 mol of alkali-metal hexatitanate (the total content of potassium oxide in terms of potassium atoms, sodium oxide in terms of sodium atoms, and lithium oxide in terms of lithium atoms relative to 1 mol of alkali-metal hexatitanate was 2.0 mol) and had the main crystal having a tunnel structure similar to potassium hexatitanate.

Table 3 lists the single phase conversion ratio, the fiber ratio, the moisture content, the degree of adhesion, the specific surface area, and the average particle diameter of the obtained alkali-metal titanate.

Example 3

An alkali-metal titanate was obtained in the same manner as in Example 1 except that each of the raw material amounts in "1. Raw materials" was changed as listed in Table 1.

The obtained alkali-metal titanate contained 1.3 mol of potassium oxide in terms of potassium atoms and 0.7 mol of sodium oxide in terms of sodium atoms relative to 1 mol of alkali-metal hexatitanate (the total content of potassium oxide in terms of potassium atoms, sodium oxide in terms of sodium atoms, and lithium oxide in terms of lithium atoms relative to 1 mol of alkali-metal hexatitanate was 2.0 mol) and had the main crystal having a tunnel structure similar to potassium hexatitanate.

Table 3 lists the single phase conversion ratio, the fiber ratio, the moisture content, the degree of adhesion, the specific surface area, and the average particle diameter of the obtained alkali-metal titanate.

Example 4

An alkali-metal titanate was obtained in the same manner as in Example 1 except that each of the raw material amounts in "1. Raw materials" was changed as listed in Table 1.

The obtained alkali-metal titanate contained 1.0 mol of potassium oxide in terms of potassium atoms and 1.0 mol of sodium oxide in terms of sodium atoms relative to 1 mol of alkali-metal hexatitanate (the total content of potassium oxide in terms of potassium atoms, sodium oxide in terms of sodium atoms, and lithium oxide in terms of lithium atoms relative to 1 mol of alkali-metal hexatitanate was 2.0 mol) and had the main crystal having a tunnel structure similar to potassium hexatitanate.

Table 3 lists the single phase conversion ratio, the fiber ratio, the moisture content, the degree of adhesion, the specific surface area, and the average particle diameter of the obtained alkali-metal titanate.

Example 5

An alkali-metal titanate was obtained in the same manner as in Example 1 except that each of the raw material amounts in "1. Raw materials" was changed as listed in Table 1.

The obtained alkali-metal titanate contained 1.8 mol of potassium oxide in terms of potassium atoms, 0.1 mol of sodium oxide in terms of sodium atoms, and 0.1 mol of lithium oxide in terms of lithium atoms relative to 1 mol of alkali-metal hexatitanate (the total content of potassium oxide in terms of potassium atoms, sodium oxide in terms of sodium atoms, and lithium oxide in terms of lithium atoms relative to 1 mol of alkali-metal hexatitanate was 2.0 mol) and had the main crystal having a tunnel structure similar to potassium hexatitanate.

Table 3 lists the single phase conversion ratio, the fiber ratio, the moisture content, the degree of adhesion, the specific surface area, and the average particle diameter of the obtained alkali-metal titanate.

Example 6

An alkali-metal titanate was obtained in the same manner as in Example 1 except that each of the raw material amounts in "1. Raw materials" was changed as listed in Table 1.

The obtained alkali-metal titanate contained 0.8 mol of potassium oxide in terms of potassium atoms, 0.6 mol of sodium oxide in terms of sodium atoms, and 0.6 mol of lithium oxide in terms of lithium atoms relative to 1 mol of alkali-metal hexatitanate (the total content of potassium oxide in terms of potassium atoms, sodium oxide in terms of sodium atoms, and lithium oxide in terms of lithium atoms relative to 1 mol of alkali-metal hexatitanate was 2.0 mol) and had the main crystal having a tunnel structure similar to potassium hexatitanate.

Table 3 lists the single phase conversion ratio, the fiber ratio, the moisture content, the degree of adhesion, the specific surface area, and the average particle diameter of the obtained alkali-metal titanate.

No impurity phases containing K, Na, and Li were observed in the main crystals of the alkali-metal titanates of Examples 1 to 6, and thus these alkal-metal titanates were included in the alkali-metal titanate represented by the general formula $K_a Na_b Li_c Ti_6 O_{13}$ (where $0.5 \leq a \leq 2.2$, $0.05 \leq b \leq 1.4$, $0 \leq c \leq 1.4$, and $1.8 \leq a+b+c \leq 2.3$).

Comparative Example 1

An alkali-metal titanate was obtained in the same manner as in Example 1 except that the calcination conditions in "3. Calcination" were changed as listed in Table 2.

The obtained alkali-metal titanate contained 1.9 mol of potassium oxide in terms of potassium atoms and 0.1 mol of sodium oxide in terms of sodium atoms relative to 1 mol of alkali-metal hexatitanate (the total content of potassium oxide in terms of potassium atoms, sodium oxide in terms of sodium atoms, and lithium oxide in terms of lithium atoms relative to 1 mol of alkali-metal hexatitanate was 2.0 mol) and had the main crystal having a tunnel structure similar to potassium hexatitanate.

Table 3 lists the single phase conversion ratio, the fiber ratio, the moisture content, the degree of adhesion, the specific surface area, and the average particle diameters of the obtained alkali-metal titanate.

Comparative Example 2

An alkali-metal titanate was obtained in the same manner as in Example 1 except that the calcination conditions in "3. Calcination" were changed as listed in Table 2.

The obtained alkali-metal titanate contained 1.9 mol of potassium oxide in terms of potassium atoms and 0.1 mol of sodium oxide in terms of sodium atoms relative to 1 mol of alkali-metal hexatitanate (the total content of potassium oxide in terms of potassium atoms, sodium oxide in terms of sodium atoms, and lithium oxide in terms of lithium atoms relative to 1 mol of alkali-metal hexatitanate was 2.0 mol) and had the main crystal having a tunnel structure similar to potassium hexatitanate.

Table 3 lists the single phase conversion ratio, the fiber ratio, the moisture content, the degree of adhesion, the specific surface area, and the average particle diameters of the obtained alkali-metal titanate.

Comparative Example 3

An alkali-metal titanate was obtained in the same manner as in Example 1 except that each of the raw material amounts in "1. Raw materials" was changed as listed in Table 1.

The obtained alkali-metal titanate contained 2.0 mol of potassium oxide in terms of potassium atoms relative to 1 mol of alkali-metal hexatitanate (the total content of potassium oxide in terms of potassium atoms, sodium oxide in terms of sodium atoms, and lithium oxide in terms of lithium atoms relative to 1 mol of alkali-metal hexatitanate was 2.0 mol) and had the main crystal having a tunnel structure similar to potassium hexatitanate.

Table 3 lists the single phase conversion ratio, the fiber ratio, the moisture content, the degree of adhesion, the specific surface area, and the average particle diameter of the obtained alkali-metal titanate.

Comparative Example 4

An alkali-metal titanate was obtained in the same manner as in Example 1 except that each of the raw material amounts in "1. Raw materials" was changed as listed in Table 1.

The obtained alkali-metal titanate contained 0.4 mol of potassium oxide in terms of potassium atoms and 1.6 mol of sodium oxide in terms of sodium atoms relative to 1 mol of alkali-metal hexatitanate (the total content of potassium oxide in terms of potassium atoms, sodium oxide in terms of sodium atoms, and lithium oxide in terms of lithium atoms relative to 1 mol of alkali-metal hexatitanate was 2.0 mol) and had the main crystal having a tunnel structure similar to potassium hexatitanate.

Table 3 lists the single phase conversion ratio, the fiber ratio, the moisture content, the degree of adhesion, the specific surface area, and the average particle diameters of the obtained alkali-metal titanate.

Comparative Example 5

An alkali-metal titanate was obtained in the same manner as in Example 1 except that each of the raw material amounts in "1. Raw materials" was changed as listed in Table 1.

The obtained alkali-metal titanate contained 0.4 mol of potassium oxide in terms of potassium atoms, 0.1 mol of sodium oxide in terms of sodium atoms, and 1.6 mol of lithium oxide in terms of lithium atoms relative to 1 mol of alkali-metal hexatitanate (the total content of potassium oxide in terms of potassium atoms, sodium oxide in terms of sodium atoms, and lithium oxide in terms of lithium atoms relative to 1 mol of alkali-metal hexatitanate was 2.1 mol) and had the main crystal having a tunnel structure similar to potassium hexatitanate.

Table 3 lists the single phase conversion ratio, the fiber ratio, the moisture content, the degree of adhesion, the specific surface area, and the average particle diameter of the obtained alkali-metal titanate.

TABLE 1

| | Raw material amount (kg) | | | | |
|---|---|---|---|---|---|
| | Titanium oxide | | | | |
| | Specific surface area 9 $m^2/g$ | Specific surface area 1.6 $m^2/g$ | Potassium carbonate | Sodium carbonate | Lithium carbonate |
| Example 1 | 54.27 | 47.60 | 27.09 | 1.03 | 0.00 |
| Example 2 | 53.17 | 47.60 | 28.21 | 1.02 | 0.00 |
| Example 3 | 55.82 | 47.60 | 18.82 | 7.76 | 0.00 |
| Example 4 | 56.61 | 47.60 | 14.59 | 11.20 | 0.00 |
| Example 5 | 54.78 | 47.60 | 25.80 | 1.04 | 0.77 |
| Example 6 | 58.79 | 47.60 | 11.92 | 6.85 | 4.83 |
| Comparative Example 1 | 54.27 | 47.60 | 27.09 | 1.03 | 0.00 |
| Comparative Example 2 | 54.27 | 47.60 | 27.09 | 1.03 | 0.00 |
| Comparative Example 3 | 54.02 | 47.60 | 28.45 | 0.00 | 0.00 |
| Comparative Example 4 | 58.23 | 47.60 | 5.93 | 18.24 | 0.00 |
| Comparative Example 5 | 57.58 | 47.60 | 5.89 | 18.13 | 0.80 |

TABLE 2

| | Calcination atmosphere | Calcination temperature (° C.) | Calcination time (hour) |
|---|---|---|---|
| Example 1 | Air | 980 | 0.5 |
| Example 2 | Air | 1,250 | 6.0 |
| Example 3 | Air | 980 | 0.5 |
| Example 4 | Air | 980 | 0.5 |
| Example 5 | Air | 980 | 0.5 |
| Example 6 | Air | 980 | 0.5 |
| Comparative Example 1 | Air | 1,100 | 3.0 |
| Comparative Example 2 | Air | 900 | 0.5 |
| Comparative Example 3 | Air | 980 | 0.5 |
| Comparative Example 4 | Air | 980 | 0.5 |
| Comparative Example 5 | Air | 980 | 0.5 |

TABLE 3

| | Single phase conversion ratio (%) | Fiber ratio (% by volume) | Moisture content (% by mass) | Degree of adhesion (g/$m^2$) | Specific surface area ($m^2$/g) | Average particle diameter (μm) |
|---|---|---|---|---|---|---|
| Example 1 | 95 | 0 | 0.4 | 2.3 | 10.5 | 11 |
| Example 2 | 98 | 0 | 0.4 | 3.6 | 0.7 | 70 |
| Example 3 | 94 | 4.3 | 0.6 | 5.6 | 10.1 | 12 |
| Example 4 | 93 | 5.7 | 0.7 | 6.6 | 9.9 | 14 |
| Example 5 | 92 | 6.4 | 0.8 | 6.7 | 9.4 | 14 |
| Example 6 | 92 | 7.9 | 0.8 | 8.2 | 9.0 | 16 |
| Comparative Example 1 | 94 | 18.6 | 0.4 | 12.3 | 1.5 | 45 |
| Comparative Example 2 | 82 | 0 | 1.2 | 40.8 | 14.0 | 7 |
| Comparative Example 3 | 96 | 6.2 | 0.4 | 13.0 | 4.9 | 20 |

TABLE 3-continued

|  | Single phase conversion ratio (%) | Fiber ratio (% by volume) | Moisture content (% by mass) | Degree of adhesion (g/m²) | Specific surface area (m²/g) | Average particle diameter (μm) |
|---|---|---|---|---|---|---|
| Comparative Example 4 | 92 | 2.9 | 1.2 | 9.0 | 5.9 | 30 |
| Comparative Example 5 | 91 | 3.3 | 1.2 | 9.1 | 5.5 | 30 |

Example 7

A friction material was produced using the alkali-metal titanate obtained in Example 1.

As a friction material raw material, together with the alkali-metal titanate produced in Example 1, a phenolic resin, artificial graphite, barium sulfate, slaked lime, antimony trisulfide, zeolite, triiron tetroxide ($Fe_3O_4$), copper fiber, cashew dust, rubber dust, aramid fiber, rock wool, phlogopite and zirconia were mixed at the mixing ratio listed in Table 4 to prepare a raw material mixed powder for a friction material.

The obtained raw material mixed powder for a friction material was preformed at 200 kgf/cm². The obtained preform was preheated at 70° C. for 2 hours and thereafter thermoformed at 180° C. and 400 kgf/cm². Subsequently, the thermoformed product was subject to heat treatment at 250° C. for 3 hours to give a friction material having a width of 20 mm, a length of 50 mm, and a thickness of 16 mm.

The friction coefficient of the obtained friction material was measured in accordance with AK-MASTER, which is a European standard for friction material evaluation. Table 5 lists the average value of the friction coefficient of CHARACTERISTIC VALUE (AK-MASTER CHAPTER 3).

Example 8

A friction material was prepared in the same manner as in Example 7 except that the alkali-metal titanate obtained in Example 1 was changed to the alkali-metal titanate obtained in Example 2. The average value of the friction coefficient of the obtained friction material was determined by the same manner as in Example 7. The results are listed in Table 5.

TABLE 4

| Raw materials of friction material | Mixed ratio (% by mass) |
|---|---|
| Alkali-metal hexatitanate | 20.95 |
| Phenolic resin | 8.48 |
| Artificial graphite | 4.89 |
| Barium sulfate | 20.95 |
| Slaked lime | 2.39 |
| Antimony trisulfide | 1.40 |
| Zeolite | 2.39 |
| Triiron tetroxide | 3.69 |
| Copper fiber | 13.97 |
| Cashew dust | 6.28 |
| Rubber dust | 2.09 |
| Aramid fiber | 4.19 |
| Rock wool | 2.35 |
| Phlogopite | 3.59 |
| Zirconia | 2.39 |

TABLE 5

|  | Friction coefficient |
|---|---|
| Example 7 | 0.308 |
| Example 8 | 0.325 |

From Table 3, it is found that the alkali-metal titanates obtained in Examples 1 to 6 contain 0.5 mol to 2.2 mol of potassium oxide in terms of potassium atoms, 0.05 mol to 1.4 moles of sodium oxide in terms of sodium atoms, and 0 mol to 1.4 mol of lithium oxide in terms of lithium atoms relative to 1 mol of alkali-metal hexatitanate, have total contents of potassium oxide in terms of potassium atoms, sodium oxide in terms of sodium atoms, and lithium oxide in terms of lithium atoms relative to 1 mol of alkali-metal hexatitanate of 1.8 mol to 2.3 mol, and have single phase conversion ratios of 85% to 100%, fiber ratios of 0% by volume to 10% by volume, and moisture contents of 0% by mass to 1.0% by mass, whereby the alkali-metal titanate in which the content ratio of fibrous potassium titanate is highly reduced and adhesion is significantly reduced can be provided.

From Table 5, it is found that the obtained friction materials using the above alkali-metal titanates exhibit good evaluation results as friction materials and exhibit friction coefficients comparable to those of practically used friction materials.

On the other hand, from Table 3, it is found that the alkali-metal titanates obtained in Comparative Examples 1 to 5 do not have the specific compositions (Comparative Example 3 and Comparative Example 4), do have the low single phase ratio (Comparative Example 2), do have the high fiber ratio (Comparative Example 1), and do have high moisture contents (Comparative Example 2, Comparative Example 4, and Comparative Example 5). Thus these alkali-metal titanates have a high content of fibrous potassium titanate or have a poor moldability, dispersibility, or adhesivity.

INDUSTRIAL APPLICABILITY

According to the present invention, the alkali-metal titanate can be provided in which the fibrous potassium titanate content is highly reduced and the adhesivity is significantly reduced and a friction material including the alkali-metal titanate can be provided.

The invention claimed is:

1. An alkali-metal titanate comprising:
   0.5 mol to 2.2 mol of potassium oxide in terms of potassium atoms,
   0.05 mol to 1.4 mol of sodium oxide in terms of sodium atoms, and
   0 mol to 1.4 mol of lithium oxide in terms of lithium atoms
   relative to 1 mol of alkali-metal hexatitanate, wherein
   a total content of potassium oxide in terms of potassium atoms, sodium oxide in terms of sodium atoms, and lithium oxide in terms of lithium atoms relative to 1 mol of alkali-metal hexatitanate is 1.8 mol to 2.3 mol; and the alkali-metal titanate has a single phase ratio of 85% to 100%, a fiber ratio of 0% by volume to 10% by volume, and a moisture content of 0% by mass to 1.0% by mass.

2. The alkali-metal titanate according to claim 1, wherein the alkali-metal titanate comprises 0.9 mol to 2.2 mol of potassium oxide in terms of potassium atoms, 0.05 mol to 1.1 mol of sodium oxide in terms of sodium atoms, and 0 mol to 0.2 mol of lithium oxide in terms of lithium atoms relative to 1 mol of alkali-metal hexatitanate, and the alkali-metal titanate has a fiber ratio of 0% by volume to 7.0% by volume and a moisture content of 0% by mass to 0.8% by mass.

3. The alkali-metal titanate according to claim 1, wherein the alkali-metal titanate comprises 1.2 mol to 2.2 mol of potassium oxide in terms of potassium atoms;

0.05 mol to 0.8 mol of sodium oxide in terms of sodium atoms; and 0 mol of lithium oxide in terms of lithium atoms relative to 1 mol of alkali-metal hexatitanate;

the total content of potassium oxide in terms of potassium atoms, sodium oxide in terms of sodium atoms, and lithium oxide in terms of lithium atoms relative to 1 mol of alkali-metal hexatitanate is 1.9 mol to 2.2 mol; and the alkali-metal titanate has a fiber ratio of 0% by volume to 5.0% by volume and a moisture content of 0% by mass to 0.6% by mass.

4. A friction material comprising the alkali-metal titanate as claimed in claim 1.

5. The alkali-metal titanate according to claim 2, wherein the alkali-metal titanate comprises 1.2 mol to 2.2 mol of potassium oxide in terms of potassium atoms;

0.05 mol to 0.8 mol of sodium oxide in terms of sodium atoms; and 0 mol of lithium oxide in terms of lithium atoms relative to 1 mol of alkali-metal hexatitanate;

the total content of potassium oxide in terms of potassium atoms, sodium oxide in terms of sodium atoms, and lithium oxide in terms of lithium atoms relative to 1 mol of alkali-metal hexatitanate is 1.9 mol to 2.2 mol; and the alkali-metal titanate has a fiber ratio of 0% by volume to 5.0% by volume and a moisture content of 0% by mass to 0.6% by mass.

6. A friction material comprising the alkali-metal titanate as claimed in claim 2.

7. A friction material comprising the alkali-metal titanate as claimed in claim 3.

8. A friction material comprising the alkali-metal titanate as claimed in claim 5.

* * * * *